United States Patent
Mishra et al.

(10) Patent No.: US 10,635,448 B2
(45) Date of Patent: *Apr. 28, 2020

(54) BYTE AND NIBBLE SORT INSTRUCTIONS THAT PRODUCE SORTED DESTINATION REGISTER AND DESTINATION INDEX MAPPING

(71) Applicant: Intel Corporation, Santa Clara, CA (US)

(72) Inventors: Asit K. Mishra, Hillsboro, OR (US); Kshitij A. Doshi, Chandler, AZ (US); Elmoustapha Ould-Ahmed-Vall, Chandler, AZ (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,739

(22) Filed: May 21, 2018

(65) Prior Publication Data
US 2019/0065209 A1    Feb. 28, 2019

Related U.S. Application Data

(63) Continuation of application No. 14/757,609, filed on Dec. 23, 2015, now Pat. No. 9,996,361.

(51) Int. Cl.
*G06F 9/30* (2018.01)
*G06F 9/38* (2018.01)

(52) U.S. Cl.
CPC .............. *G06F 9/3889* (2013.01); *G06F 9/30* (2013.01); *G06F 9/30032* (2013.01); *G06F 9/30036* (2013.01); *G06F 9/30043* (2013.01); *G06F 9/30112* (2013.01); *G06F 9/3861* (2013.01); *G06F 9/3887* (2013.01)

(58) Field of Classification Search
CPC ..................... G06F 9/30032; G06F 9/30036
See application file for complete search history.

(56) References Cited

U.S. PATENT DOCUMENTS

| | | |
|---|---|---|
| 2004/0117602 A1 | 6/2004 | Tripathy et al. |
| 2006/0184765 A1 | 8/2006 | Krueger |
| 2009/0254718 A1 | 10/2009 | Biscondi et al. |
| 2013/0097187 A1 | 4/2013 | Ingle et al. |
| 2014/0189322 A1 | 7/2014 | Ould-Ahmed-Vall |
| 2014/0297991 A1 | 10/2014 | Corbal et al. |
| 2015/0026440 A1 | 1/2015 | Ould-Ahmed-Vall et al. |
| 2015/0277912 A1 | 10/2015 | Gueron et al. |

OTHER PUBLICATIONS

International Search Report and Written Opinion for International Application No. PCT/US2016/063655, dated Mar. 20, 2017.
Supplemental European Search Report dated Oct. 17, 2019, on application No. EP 16 87 9798.

*Primary Examiner* — Jacob Petranek
(74) *Attorney, Agent, or Firm* — Lowenstein Sandler LLP

(57) ABSTRACT

A processor comprises a first register to store a plurality of data items at a plurality of positions within the first register, a second register, and an execution unit, operatively coupled to the first register and the second register, the execution unit comprising a logic circuit implementing a sort instruction for sorting the plurality of data items stored in the first register in an order of data item values, and storing, in the second register, a plurality of indices, wherein each index identifies a position associated with a data item stored in the first register prior to the sorting.

20 Claims, 12 Drawing Sheets

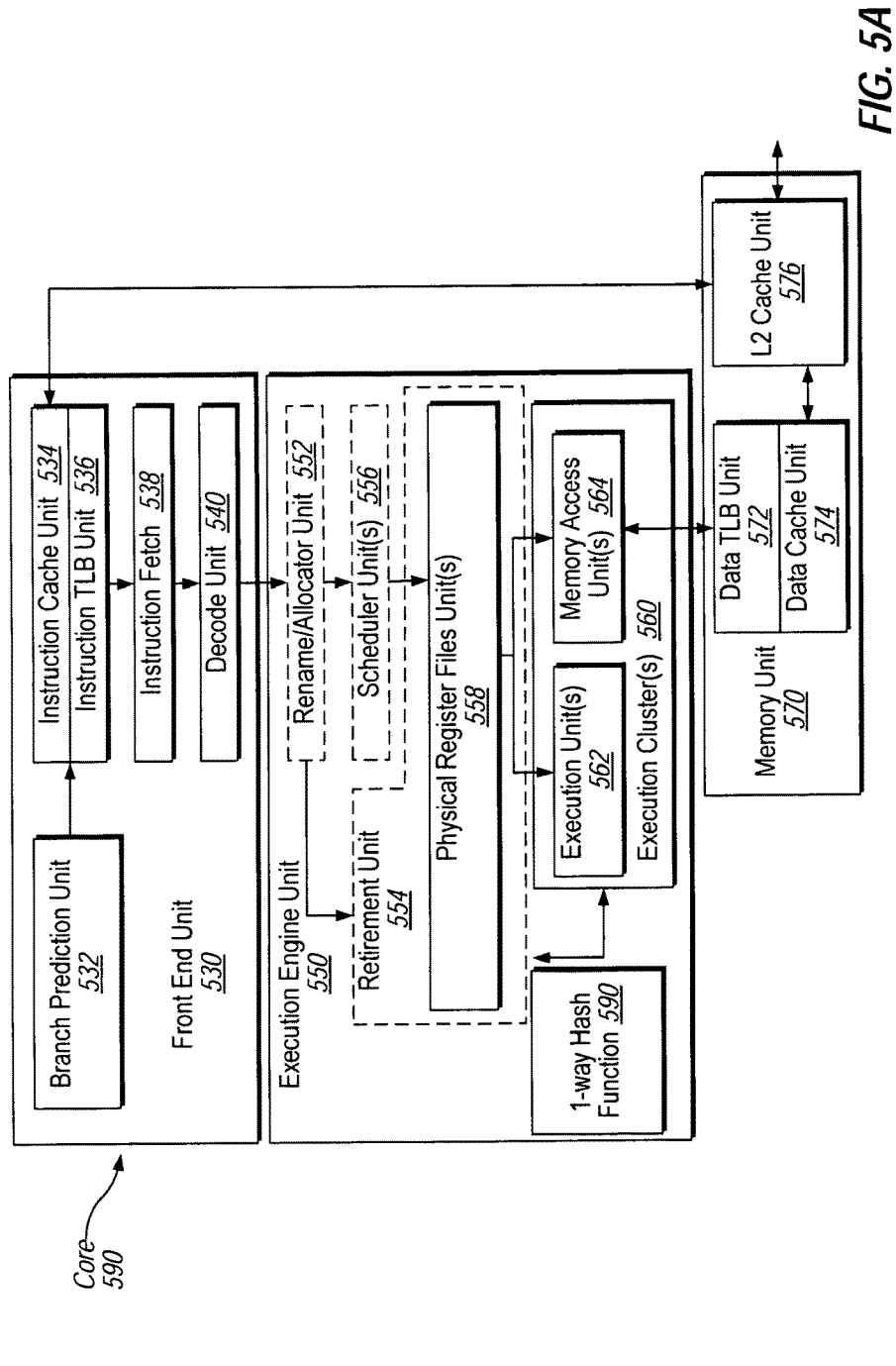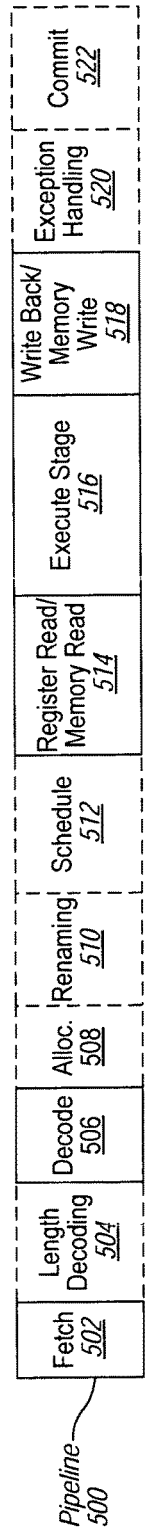

BYTE AND NIBBLE SORT INSTRUCTIONS THAT PRODUCE SORTED DESTINATION REGISTER AND DESTINATION INDEX MAPPING

CROSS REFERENCE TO RELATED APPLICATION

This application is a continuation of U.S. patent application Ser. No. 14/757,609, filed on Dec. 23, 2015, which is hereby incorporated by reference herein.

TECHNICAL FIELD

The present disclosure relates to processors of computing devices and, more specifically, to an instruction set architecture (ISA) employed by these processors.

BACKGROUND

An instruction set, or instruction set architecture (ISA), is part of the computer architecture related to programming of the computer. The programming may relate to different aspects of the computer, including the native data types associated with instructions, register architecture, addressing modes, memory architecture, interrupt and exception handling, and external input and output (I/O). It should be noted that the term instruction generally refers herein to macro-instructions implemented in logic circuitry in the form of dedicated execution units of the processor.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor including heterogeneous core in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

Figure 1:
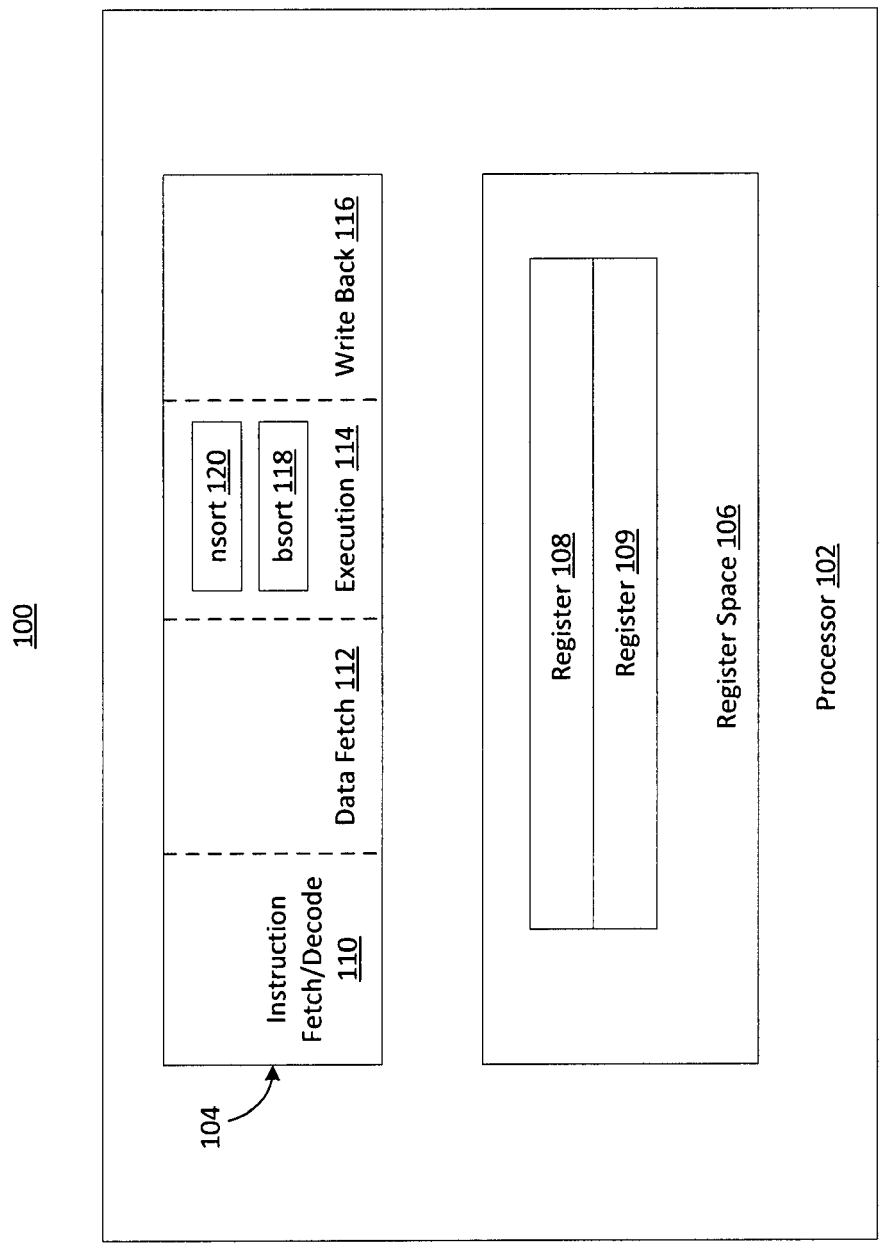
FIG. 1 illustrates a system-on-a-chip (SoC) including a processor according to an embodiment of the present disclosure.

Embodiments of the present disclosure relate to an instruction set architecture (ISA) including a class of sort instructions that, when executed, may sort data items stored in a first register into an ordered sequence either according to descending values or according to ascending values of these data items. Each register may include multiple logic positions to store data items, and each position may be associated with a position number. The ordered sequence of data items, generated as a result of executing one of the sort instructions, may still be stored in the first register, and an index mapping from the original sequence to the ordered sequence of data items in terms of their position numbers before sorting may be stored in a second register.

In one embodiment, the first register and the second register may have the same length in terms of bits. For example, a data item and an index may occupy a same number of bits, and the first register may be capable of storing a same number of data items as the number of indices stored in the second register. In another embodiment, the first register and the second register may have different lengths in terms of bits. For example, a data item may occupy more bits than an index. Thus, to store a same number of indices in the second register as the number of data items stored in the first register, the length of the second register can be shorter than the first register.

In one embodiment, the data items are bytes, each byte including eight bits and reflecting a data value ranging from 0 to 255. These bytes may be stored in a first general purpose register (GPR) associated with a processor, whereas each byte is stored at a position identified by a position number within the register. The position number may be associated with a sequential index value. For example, a 64-bit GPR may store eight bytes with the first byte (byte index 0) stored in bits 0-7, the second byte (byte index 1) stored in bits 8-13, ..., and the eighth byte (byte index 7) stored in bits 56-63. An ISA associated with the processor may include a byte sort instruction (referred to as bsort herein) that, when executed by the processor, may sort the bytes stored in the first GPR into an ordered sequence according to their values (byte values) and store the ordered byte sequence in the first GPR. The execution of bsort may also generate and store the index mapping from the original sequence to the ordered sequence of bytes in a second GPR associated with the processor.

In another embodiment, the data items are nibbles (also referred to as half-bytes or quadbits), each nibble including four bits and reflecting a data value ranging from 0 to 15. These nibbles may be stored in a first general purpose register (GPR) associated with a processor, whereas each nibble is stored at a position identified by a position number within the register. The position number may be associated with a sequential index value. For example, a 64-bit GPR may store 16 nibbles with the first nibble (nibble index 0) stored in bits 0-3, the second nibble (nibble index 1) stored in bits 4-7, ..., and the 16th nibble (nibble index 15) stored in bits 60-63. An ISA associated with the processor may include a nibble sort instruction (referred to as nsort herein) that, when executed by the processor, may sort the nibbles stored in the first GPR into an ordered sequence according to their values (nibble values) and store the ordered nibble sequence in the first GPR. The execution of nsort may also generate and store the index mapping from the original sequence to the ordered sequence of nibbles in a second GPR associated with the processor.

FIG. 1 illustrates a system-on-a-chip (SoC) 100 including a processor 102 according to an embodiment of the present disclosure. Processor 102 may include logic circuitry fabricated on a semiconductor chipset such as SoC 100. Processor 100 can be a central processing unit (CPU), a graphics processing unit (GPU), or a processing core of a multi-core processor. As shown in FIG. 1, processor 102 may include an instruction execution pipeline 104 and a register space 106. Pipeline 104 may include multiple pipeline stages, and each stage includes logic circuitry fabricated to perform operations of a specific stage in a multi-stage process needed to fully execute an instruction specified in an instruction set architecture (ISA) of processor 102. In one embodiment, pipeline 104 may include an instruction fetch/decode stage 110, a data fetch stage 112, an execution stage 114, and a write back stage 116.

Register space 106 is a logic circuit area including different types of registers associated with processor 102. In one embodiment, register space 106 may include general purpose registers 108, 109 that each may include a certain number (referred to as the "length") of bits to store data items processed by instructions executed in pipeline 104. For example, depending on implementations, registers 108, 109 can be 64-bit, 128-bit, 256-bit, or 512-bit registers. Each of the registers 108, 109 may store one or more data items (e.g., bytes or nibbles). In one embodiment, processor 102 may a single-instruction-multiple-data (SIMD) processor, namely processor 102 may execute one instruction to process multiple data items stored in registers 108, 109. In one embodiment, registers 108, 109 may be general purpose registers that may be used to store transient data.

The source code of a program may be compiled into a series of machine-executable instructions defined in an instruction set architecture (ISA) associated with processor 102. When processor 102 starts to execute the executable instructions, these machine-executable instructions may be placed on pipeline 104 to be executed sequentially. Instruction fetch/decode stage 110 may retrieve an instruction placed on pipeline 104 and identify an identifier associated with the instruction. The instruction identifier may associate the received instruction with one specified in the ISA of processor 102.

The instructions specified in the ISA may be designed to process data items stored in general purpose registers (GPRs) 108, 109. Data fetch stage 112 may retrieve data items (e.g., bytes or nibbles) to be processed from GPR 108. Execution stage 114 may include logic circuitry to execute instructions specified in the ISA of processor 102.

In one embodiment, the logic circuitry associated with execution stage 114 may include multiple "execution units" (or functional units), each being dedicated to perform one respective instruction. The collection of all instructions performed by these execution units may constitute the instruction set associated with processor 102. After execution of an instruction to process data items retrieved by data fetch stage 112, write back stage 116 may output and store the results in GPRs 108, 109.

In one embodiment, the ISA of processor 102 may define a bsort instruction, and the execution stage 114 of processor 102 may include a bsort execution unit 118 that include hardware implementation of the bsort instruction defined in the ISA. The bsort instruction, when executed using bsort execution unit 118, may sort bytes stored in GPR 108 (previously retrieved by data fetch stage 112 from a first GPR) into an ordered sequence, whereas the sequence is ordered according to their byte values. In one embodiment, the ordered sequence may be a sequence of bytes in an order of descending values, resulting in the byte having the highest value associated with the lowest position number of the first GPR and the byte having the lowest value associated with the highest position number of the first GPR. In another embodiment, the ordered sequence may be a sequence of bytes in an order of ascending values from the lowest position number to the highest position number. The execution of the bsort instruction by bsort execution unit 118 may also generate and store, in a second GPR, an index mapping from the original sequence to the ordered sequence of bytes. In one embodiment, the original sequence of data items is stored sequentially at a sequence of data item positions of the first GPR. Each of the data item position may be associated with an index value (e.g., 0, 1, . . . , n) identifying the byte's position number before the sorting. The index mapping stored in the second GPR as a result of executing bsort contains the original position numbers of the ordered sequence of bytes. Thus, the output of executing the bsort includes an ordered sequence of bytes in a first GPR and a sequence of corresponding indices in a second GPR.

The bsort may take the following format: bsort GPR-A GPR-B, wherein the GPR-A and GPR-B are two GPRs. If GPR-A and GPR-B are 64-bit GPRs, GPR-A may store 8 bytes. In response to executing the bsort instruction, the bytes stored in GPR-A may be rearranged into an ordered sequence, and GPR-B may store eight index values associated with the bytes in the ordered sequence.

Figure 2:
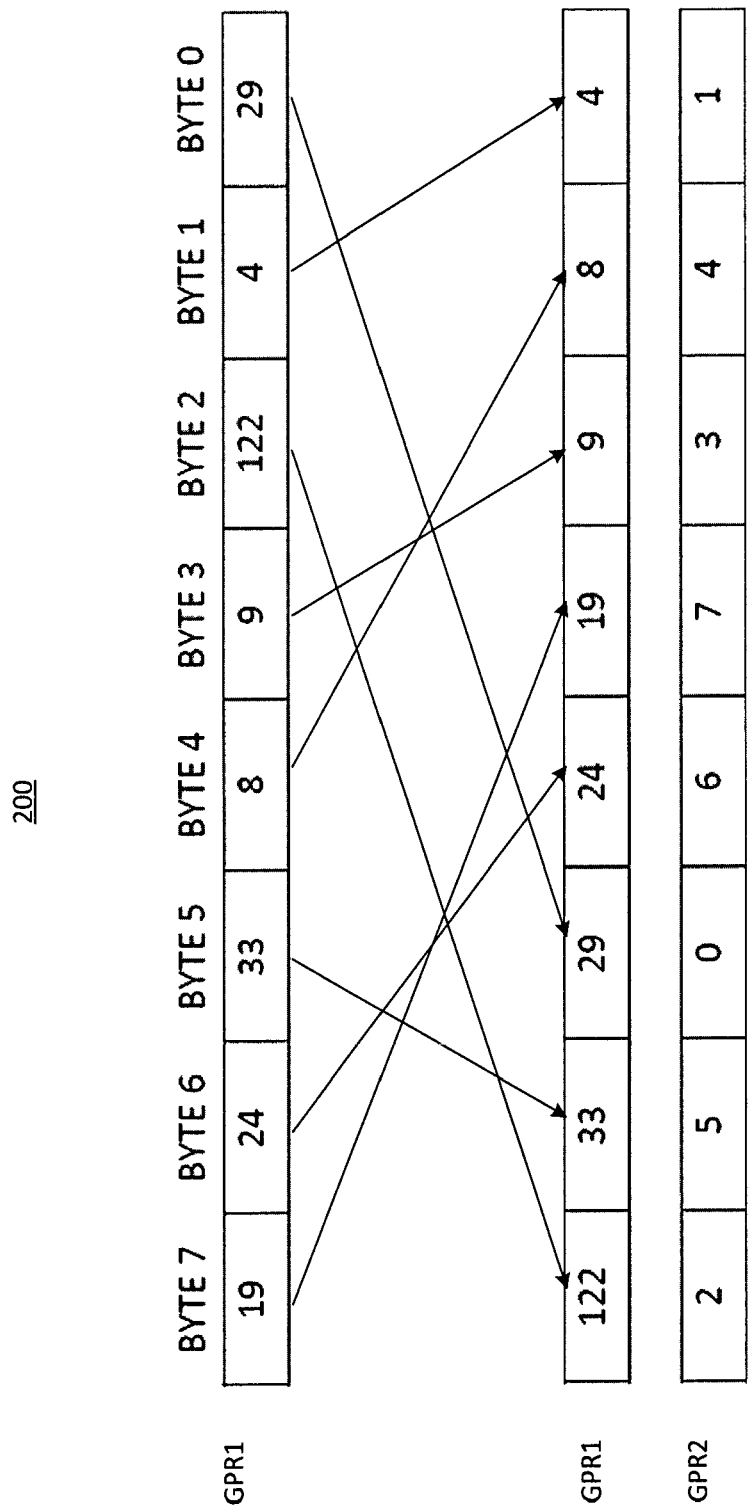
FIG. 2 illustrates an example using bsort to sort bytes stored in general purpose registers according to an embodiment of the present disclosure.

FIG. 2 illustrates an example using bsort to sort bytes stored in general purpose registers according to an embodiment of the present disclosure. As shown in FIG. 2, a processor (not shown) may be associated with GPRs such as 64-bit registers of GPR-A and GPR-B. Each of the 64-bit GPR-A or GPR-B may store eight bytes. In this example, GPR-A may store eight bytes having different values. These eight bytes may be stored in GPR-A from byte position 0 to byte position 7, where each byte position number is used to identify respective one byte. The byte positions 0 through 7 may be correspondingly assigned with sequential index values from 0 through 7 (e.g., 29, 4, 122, 9, 8, 33, 24, 19 from byte 0 to byte 7). Each byte position may include eight bits. Thus, the first byte at byte position 0 may occupy the first (or lowest) eight bits of GPR-A, the second byte at byte position 1 may occupy the second eight bits of GPR-A, and so on. The bsort instruction may be associated with two GPRs in the following format: bsort GPR-B GPR-A, whereas the GPR-A is the GPR for storing the eight bytes to be sorted, and the results of executing bsort may be stored in GPR-A and GPR-B.

Referring to FIG. 2, in response to executing the bsort instruction, the bytes stored in GPR-A may be rearranged according to an ascending order, namely from (29, 4, 122, 9, 8, 33, 24, 19) to (4, 8, 9, 19, 24, 29, 33, 122). Thus, the values of byes stored in GPR-A increase from the lowest position number to the highest position number in GPR-A. Stored in GPR-B may be an index mapping that represents the relations between bytes in the original sequence to bytes in the ordered sequence. Since the indices for the bytes in the original sequence are sequential numbers (i.e., 0, 1, . . . , 7), the index mapping stored in GPR-B may be the index values arranged in the same order of their corresponding bytes in the ordered sequence stored in GPR-A. Thus, after executing the bsort, GPR-B may contain an index mapping of (1, 4, 3, 7, 6, 0, 5, 2). In an alternative embodiment, bsort may rearrange the bytes in GPR-A to a descending order from (29, 4, 122, 9, 8, 33, 24, 19) to (122, 33, 29, 24, 19, 9, 8, 4), and store an index mapping of (2, 5, 0, 6, 7, 3, 4, 1) in GPR-B.

In one embodiment, execution stage 114 may include an nsort execution unit 120 to correspondingly perform the nsort instruction specified in the ISA. The nsort instruction, when executed using nsort execution unit 120, may sort nibbles stored in GPR 108 (previously retrieved by data fetch stage 112 from a first GPR) into an ordered sequence, whereas the sequence is ordered according to their nibble values. In one embodiment, the ordered sequence may be a sequence of nibbles in an order of descending values. In another embodiment, the ordered sequence may be a sequence of nibbles in an order of ascending values. The execution of the nsort instruction may also generate and store, in a second GPR, an index mapping from the original sequence to the ordered sequence of nibbles. In one embodiment, the original sequence of data items are stored sequentially at a sequence of data item positions of the first GPR. Each of the data item position may be associated with an index value (e.g., 0, 1, . . . , N). The index mapping stored in the second GPR as a result of executing nsort contains the corresponding index values for nibbles in the ordered sequence. Thus, the output of executing the nsort includes an ordered sequence of nibbles in a first GPR and an index mapping in a second GPR.

The nsort may take the following format: nsort GPR-B GPR-A, wherein the GPR-A, GPR-B are GPRs. If GPR-A, GPR-B are 64-bit GPRs, GPR-A may store 16 nibbles. In response to executing the nsort instruction, the nibbles stored in GPR-A may be rearranged into an ordered sequence, and GPR-B may store an index mapping associated with the nibbles in the ordered sequence.

Because bsort (or nsort) instruction is implemented in logic circuit as one execution unit of processor 102, the execution of bsort (or nsort) instruction may be carried out in fewer processor cycles than similar software implementations. In one embodiment, the execution of bsort (or nsort) may be performed by the execution unit in no more than five processor cycles.

In one embodiment, this class of sort instructions (including bsort and nsort) may be used in conjunction with other instructions specified in the ISA to efficiently achieve new functionalities. In one embodiment, the bsort may be used to convert a pull-style permutation instruction defined in the ISA into a push-style permutation instruction without the need to add an execution unit corresponding to the push-style permutation. Some implementations of ISA include pull-style data permutation instructions (e.g., VPERM in x86 ISA) that may permute a first arrangement of data items stored in a first GPR (source GPR) into a second arrangement of data items stored in a second GPR (destination GPR) according to a byte index mapping stored in a third GPR (index GPR). In contrast, a push-style permutation may push the source data items from the first GPR to the second GPR based on an index permutation of the destination GPR.

With respect to the pull-style permutation, the byte index mapping specifies the second arrangement of data items in terms of their original byte positions (or byte indices) in the first GPR. Thus, the byte index mapping is an index permutation of the source data items, and the processor may sequentially fill the byte positions (e.g., from byte 0 to byte 7) of the second GPR by pulling data items from the first GPR based on the byte index mapping. For example, in x86 ISA architectures, the VPERM instruction may take on the following format: VPERM zimm2, zimm3, zimm1, wherein zimm1-zimm3 are GPRs of certain length, zimm1 is used to store the data items in a first arrangement to be permutated, zimm2 is used to store the resulting data items permutated into a second arrangement, and zimm3 is used to store a byte index mapping from the first arrangement to the second arrangement. Thus, the byte positions of the second GPR (zimm2) may be sequentially filled by pulling data items from the first GPR (zimm1) in accordance with the byte index mapping stored in the third GPR (zimm3).

Under certain situations, it may be desirable to sequentially push the source data items from the first GPR to the second GPR. One solution may include scattering the source data items to a cache memory (L1 or L2 cache) and then perform a packed-gather operation to read from the cache memory into the GPRs to achieve results of the push-style permutation of data items. This, however, may deteriorate the processor performance because the design of certain architectures may have limited number (typically only one) of write ports which can be a bottle-neck for data transfer between the cache memory and the GPR.

Figure 3:
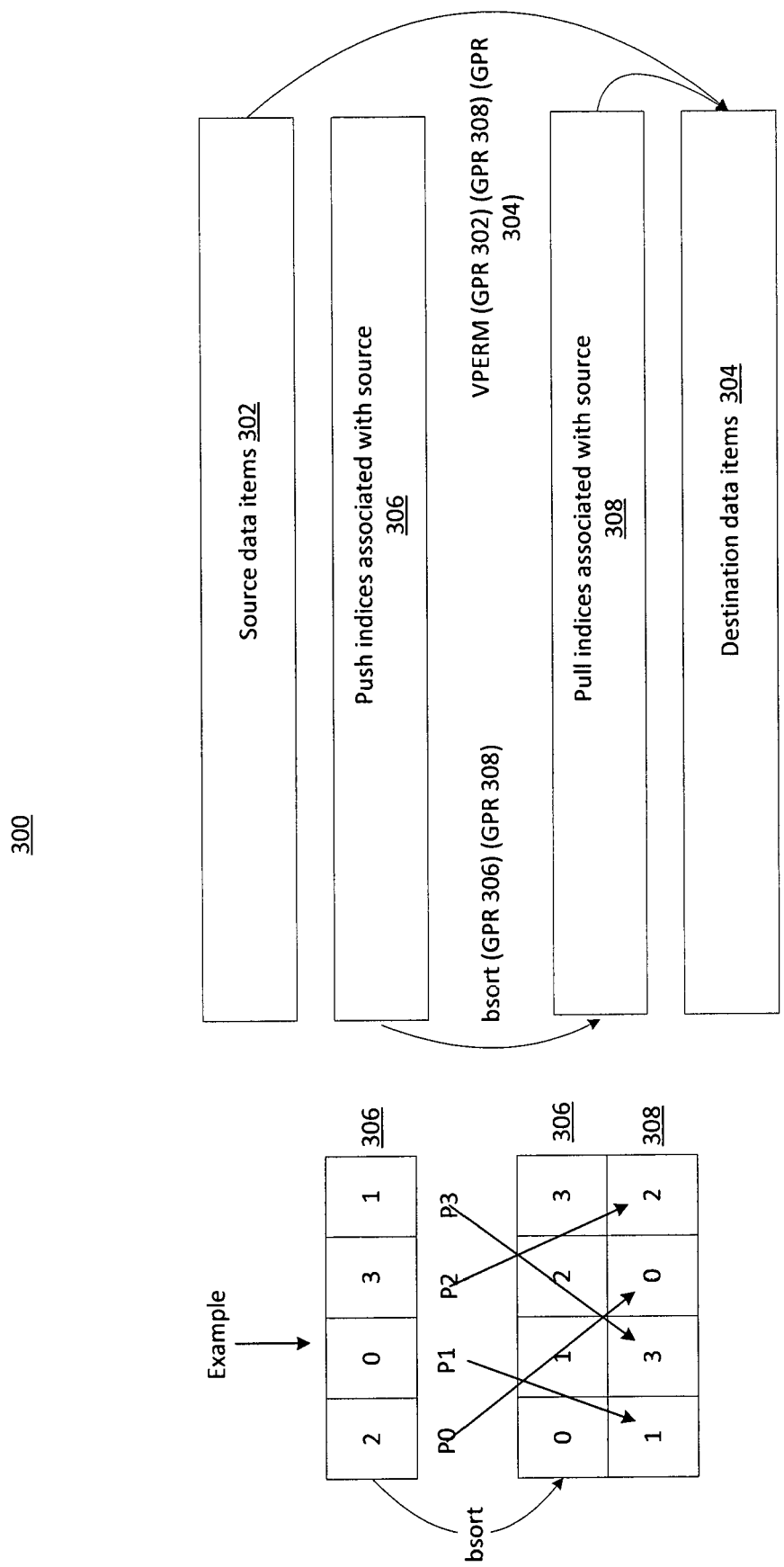
FIG. 3 illustrates an example of using bsort (or nsort) and a pull-style permutation to achieve the push-style data permutation according to an embodiment of the presentation.

In one embodiment, the bsort (or nsort) instruction may be used in conjunction with the pull-style permutation instruction (e.g. VPERM of x86 ISA) that is already defined in the ISA to achieve the push-style permutation functionality as provided in details in conjunction with FIG. 3. To achieve this, the index permutation of the destination GPR for the push-style permutation may be transformed into the byte index mapping used by the pull-style permutation. The transformation may be achieved by executing the bsort (or nsort) instruction on the index permutation of the destination GPR.

In one embodiment, the index permutation of the destination GPR may be stored in a fourth GPR (zimm4). The bsort instruction for 8-bit long indices (or nsort for 4-bit long indices) may be executed to sort the index permutation stored in a fourth GPR and generate the byte index mapping that can be used by the pull-style permutation instruction in the third GPR. The pull-style permutation instruction may then be executed to pull data from source register based on the generated byte index mapping in the third GPR into the second GPR. Thus, the push-style data permutation may be achieved by combining a bsort (or nsort) and a pull-style permutation already defined in the ISA.

FIG. 3 illustrates an example of using bsort (or nsort) and a pull-style permutation to achieve the push-style data permutation according to an embodiment of the presentation. As shown in FIG. 3, GPR 302 may store a first arrangement of data items (e.g., bytes) that need to be pushed to GPR 304 using the byte index mapping stored in GPR 306. To achieve the push-style data permutation using a pull-style permutation instruction (e.g., VPERM) already defined in the ISA, the byte index mapping stored in GPR 306 for the push-style data permutation may first be converted into a byte index mapping for the pull-style permutation and stored in GPR 308. This conversion may be achieved by executing the bsort instruction to sort the indices stored in GPR 306 as following: bsort (GPR 306) (GPR 308). For example, as shown in FIG. 3, GPR 306 may originally store an index mapping (1, 3, 0, 2) for the push-style permutation. The execution of bsort (GPR 306) (GPR 308) may sort the index values stored in GPR 306 into an ordered sequence of descending values and store the index mapping (2, 0, 3, 1) for the pull-style permutation in GPR 308. The execution of the bsort instruction may convert the index mapping (stored in GPR 306) associated with push-style permutation into the byte index mapping (stored in GPR 308) associated with pull-style permutation. In response to executing the bsort instruction, the byte index mapping stored in GPR 308 may be used to execute the pull-style permutation to complete the permutation of data items. The pull-style permutation may be executed as: VPERM (GPR 304) (GPR 308) (GRP 302). Thus, the data items stored GPR 302 may be permuted and stored in GPR 304 to complete the push-style data item permutation.

In this way, the push-style permutation of data items stored in a source GPR is realized by re-using the existing pull-style VPERM instruction that is already specified in the ISA.

Figure 4:
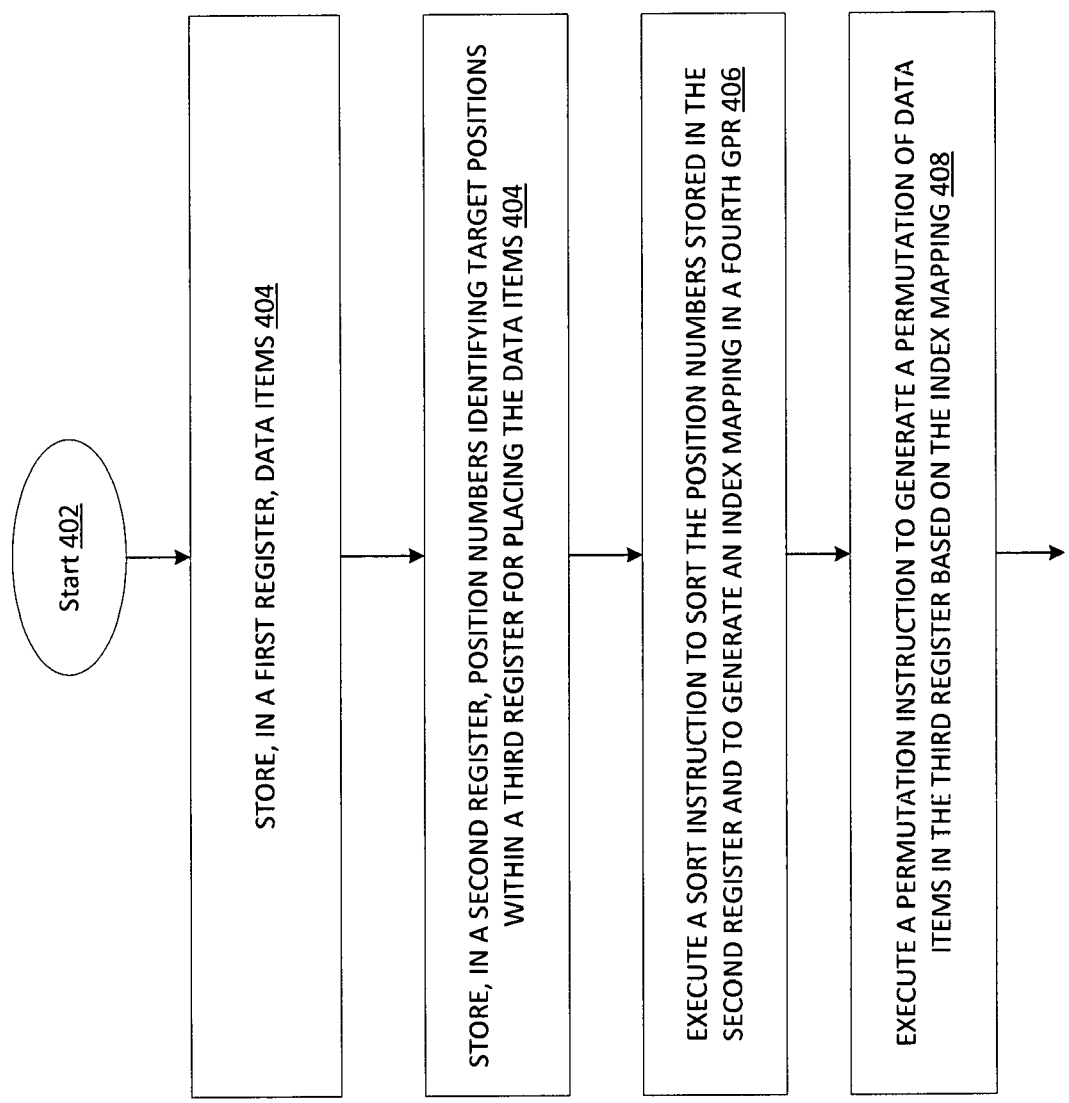
FIG. 4 is a block diagram of a method to perform date item permutation according to an embodiment of the present disclosure.

FIG. 4 is a block diagram of a method 400 to perform date item permutation according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of the processor 102 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, the operations may start. At 404, processor 102 may store data items in a first GPR. These data items are to be permutated by a push-style permutation.

At 406, processor 102 may store, in a second GPR, position numbers representing target positions in a third register for placing these data items.

At 408, processor 102 may execute sort instruction defined in an ISA of the processor to sort these position numbers according to an order of descending values and generate an index mapping in a fourth register. In one embodiment, the sort instruction can be the bsort instruction. In another embodiment, the sort instruction can be the nsort instruction.

At 410, processor 102 may execute a pull-style permutation instruction (e.g., VPERM) to generate a permutation of these data items in the third GPR based on the index mapping in the fourth register.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s)

unit(s) 558, and execution cluster(s) 560 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
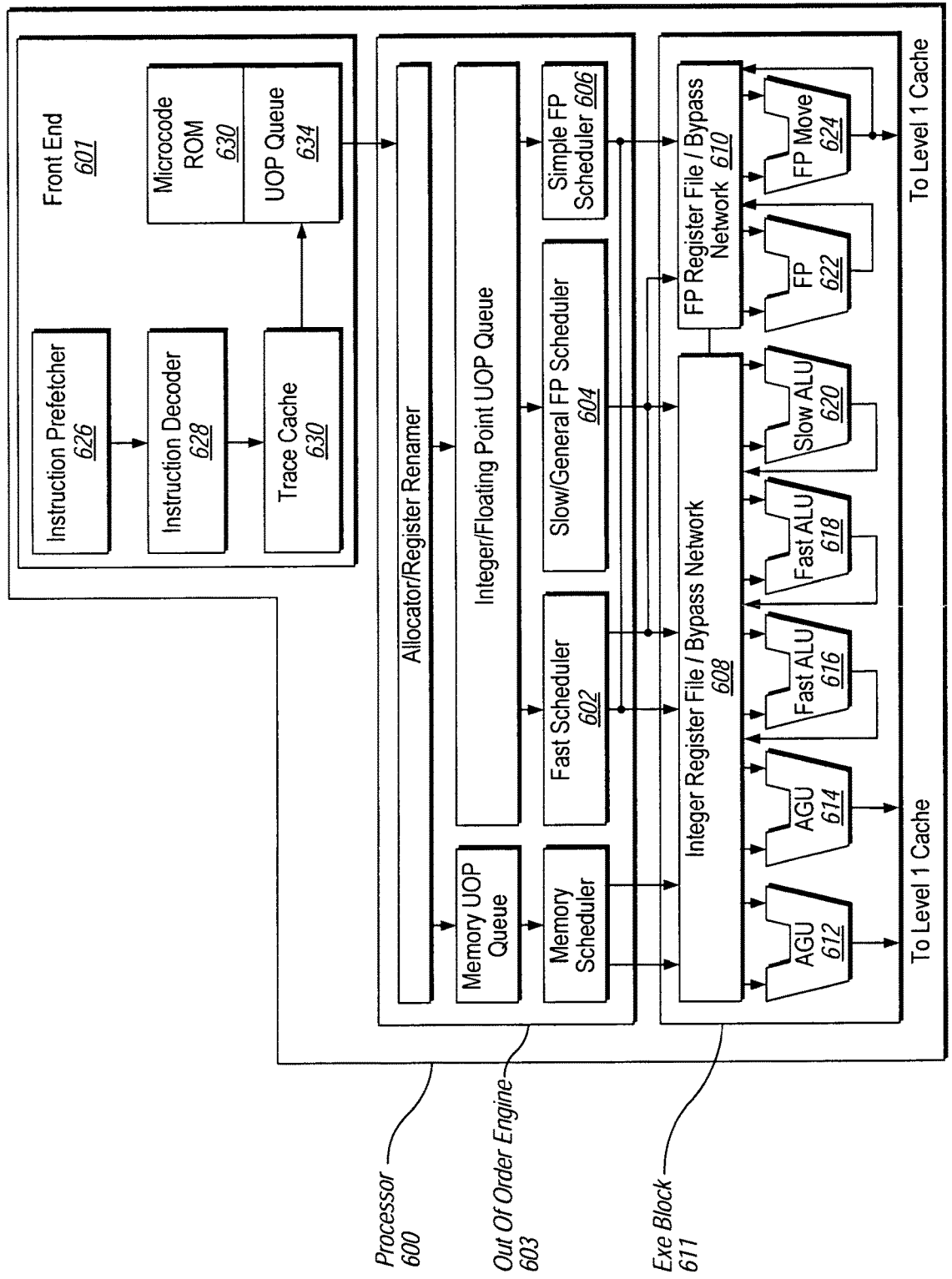
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
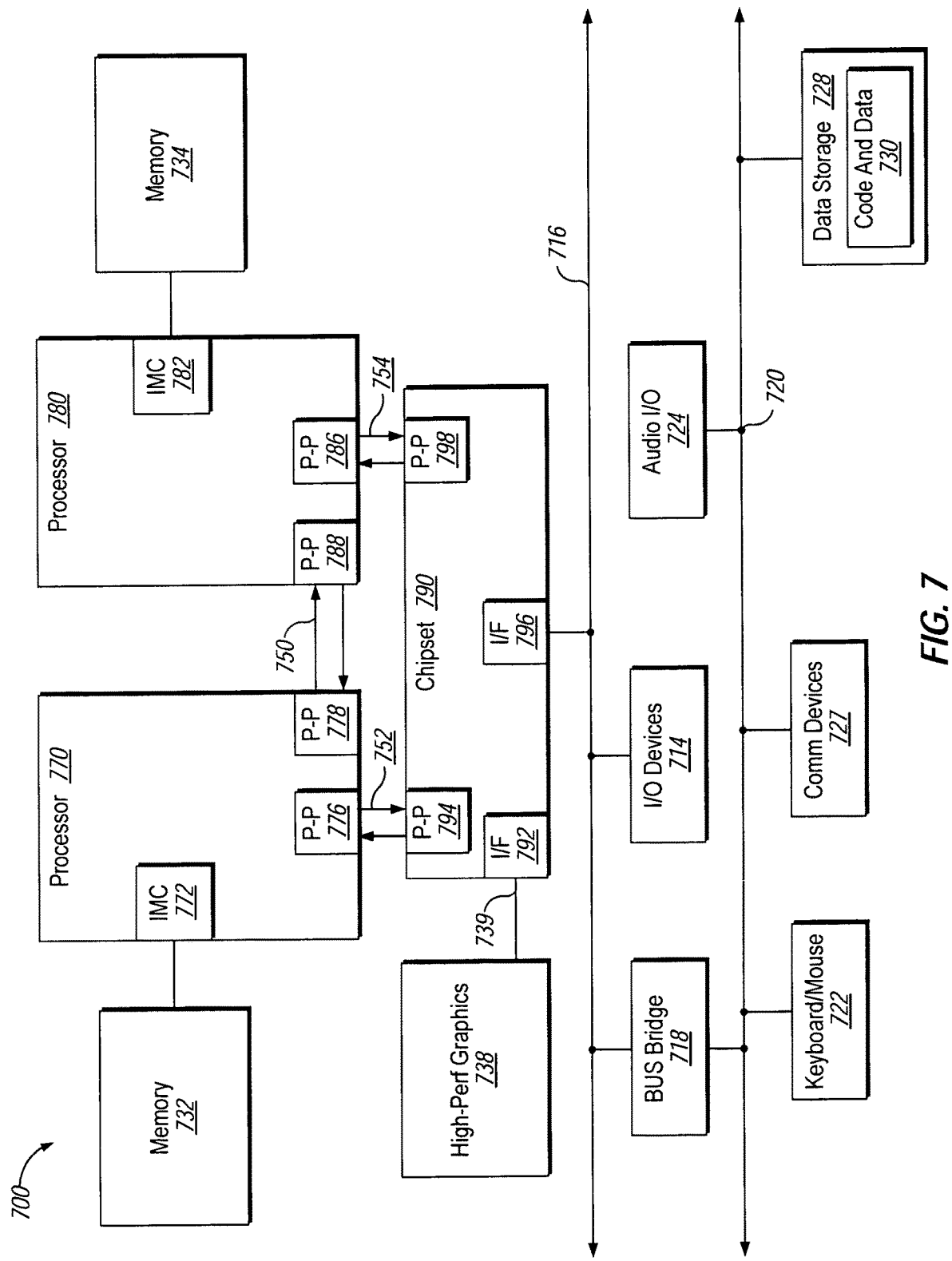
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
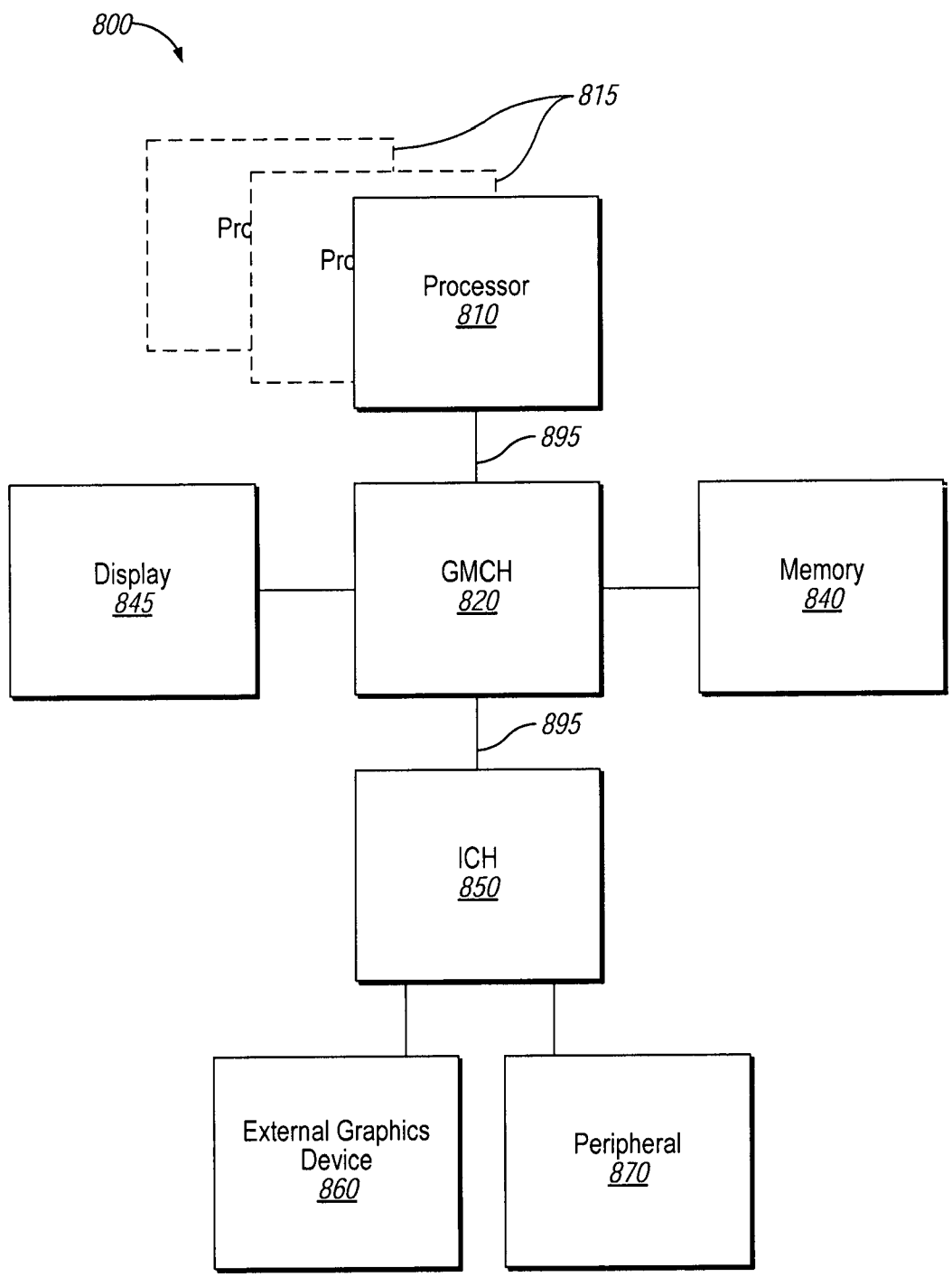
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
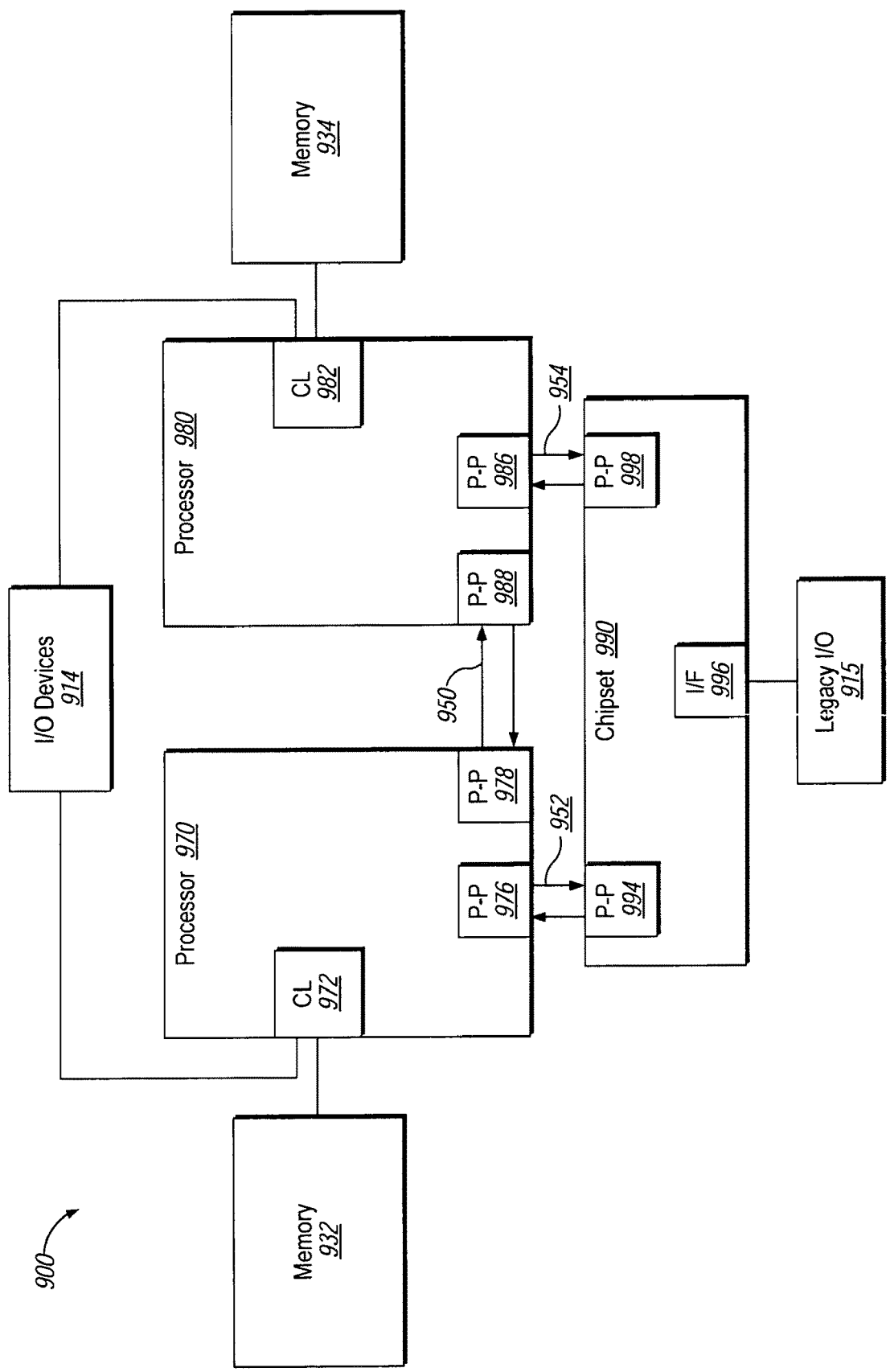
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
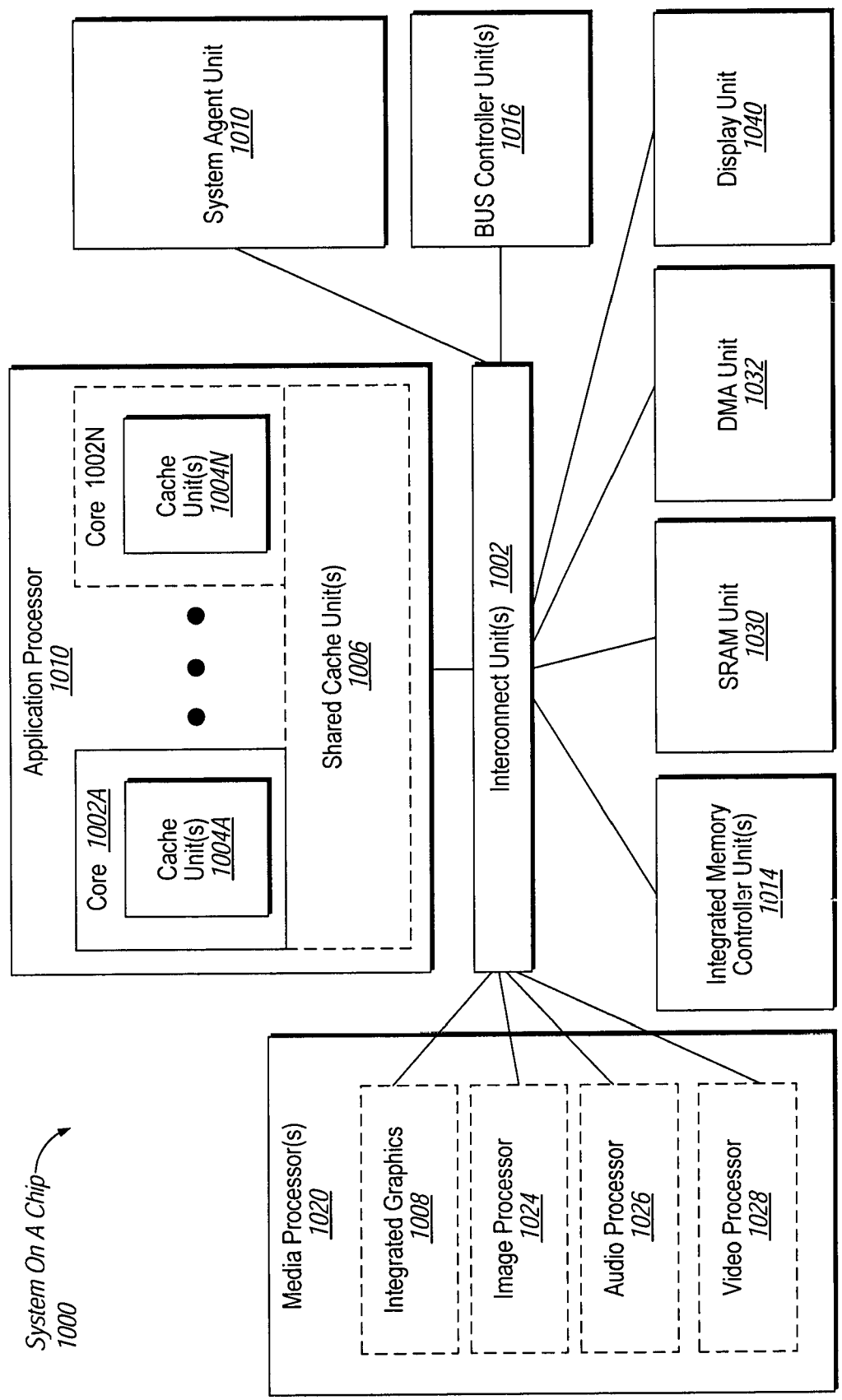
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™ Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
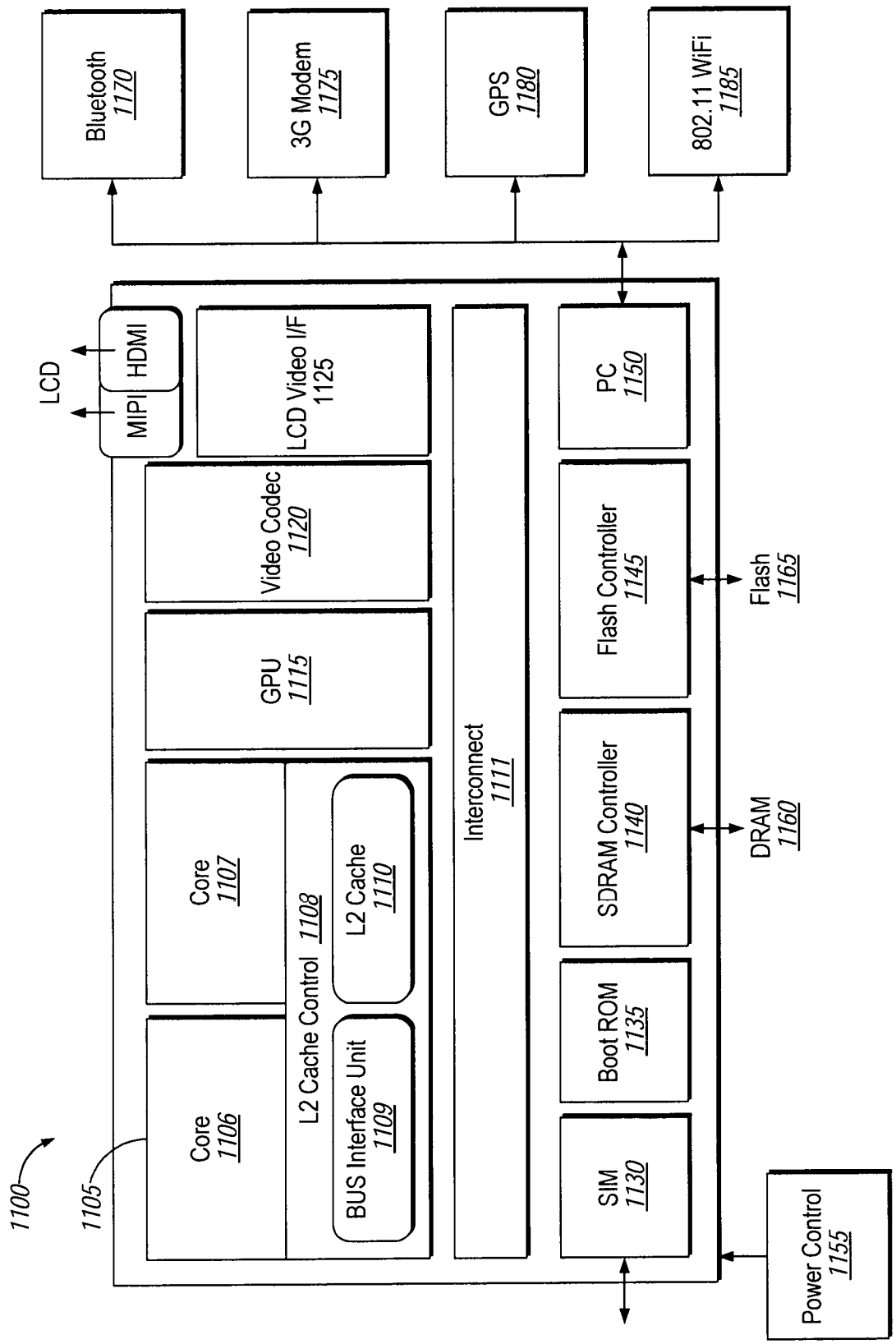
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
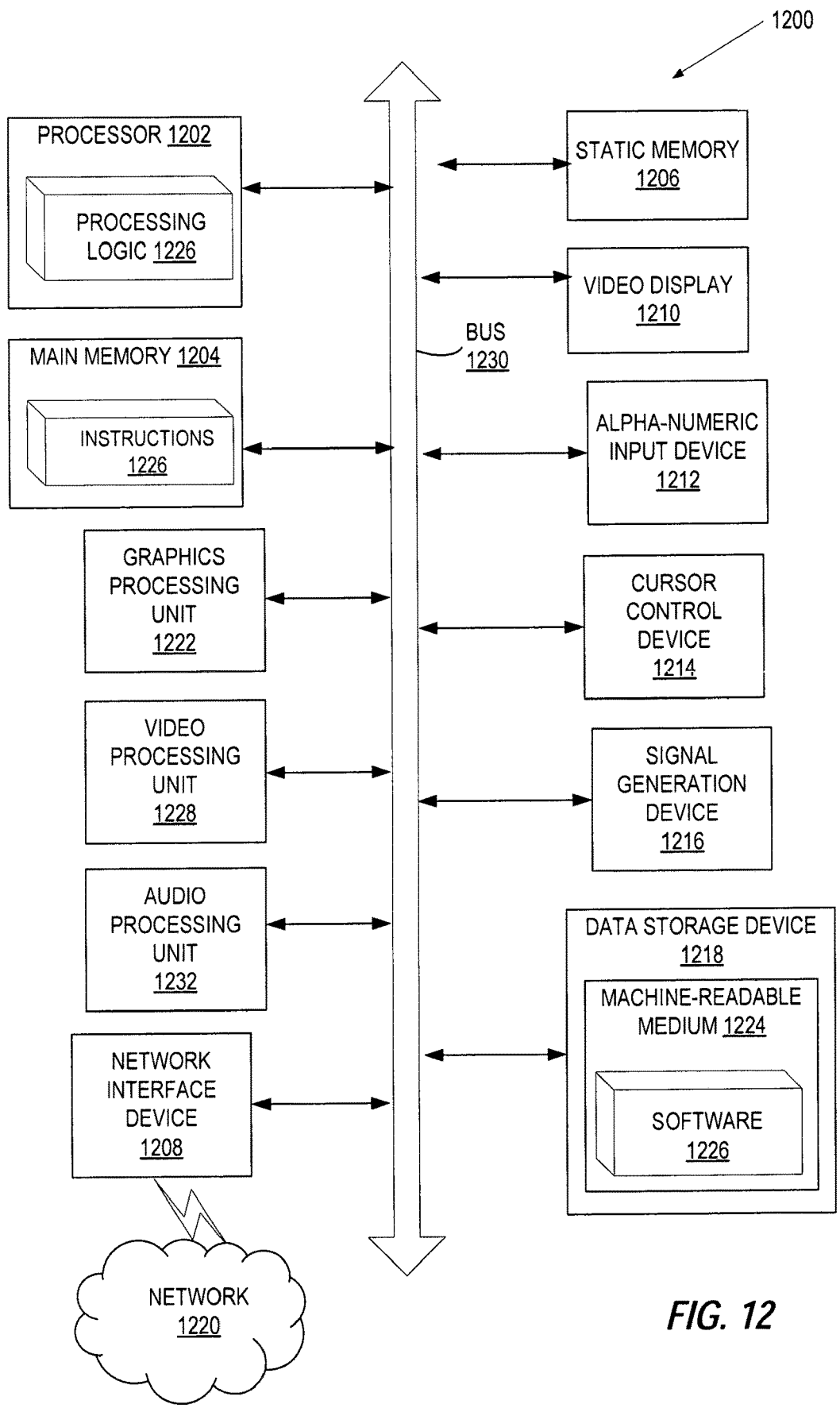
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor comprising a first register to store a plurality of data items at a plurality of positions within the first register, a second register, and an execution unit, operatively coupled to the first register and the second register, the execution unit comprising a logic circuit implementing a sort instruction for sorting the plurality of data items stored in the first register in an order of data item values, and storing, in the second register, a plurality of indices, wherein each index identifies a position associated with a data item stored in the first register prior to the sorting.

In Example 2, the subject matter of Example 1 can further provide that the sort instruction is a byte sort instruction, and wherein the plurality of data items is a plurality of bytes.

In Example 3, the subject matter of Example 1 can further provide that the sort instruction is a nibble sort instruction, and wherein the plurality of data items is a plurality of nibbles.

In Example 4, the subject matter of any of Examples 1, 2, and 3 can further provide that each position within the first register is associated with a position number, and wherein the each index identifies the position associated with the data item by the position number associated with the position.

In Example 5, the subject matter of any of Examples 1, 2, and 3 can further provide that the plurality of indices are stored in a plurality of positions within the second register in an order relating to the order of the plurality of data items stored in the first register after the sorting.

In Example 6, the subject matter of any of Examples 1, 2, and 3 can further provide that the first register and the second register are general purpose registers that have a same length.

In Example 7, the subject matter of any of Examples 1, 2, and 3 can further provide that the first register and the second register are general purpose registers that have different lengths.

In Example 8, the subject matter of any of Examples 1, 2, and 3 can further provide that the order of the data item values is an order of one of ascending data item values or descending data item values.

In Example 9, the subject matter of any of Examples 1, 2, and 3 can further provide that when executed, the processor employs the logic circuit to complete the sort instruction in no more than five processor cycles.

Example 10 is a system-on-a-chip (SoC) including a first register to store a plurality of data items at a plurality of positions within the first register, a second register, and a processor, operatively coupled to the first register and the second register, the processor comprising an execution unit comprising a logic circuit implementing a sort instruction for sorting the plurality of data items stored in the first register in an order of data item values, and storing, in the second register, a plurality of indices, wherein each index identifies a position associated with a data item stored in the first register prior to the sorting.

In Example 11, the subject matter of Example 10 can further provide that the sort instruction is a byte sort instruction, and wherein the plurality of data items is a plurality of bytes.

In Example 12, the subject matter of Example 10 can further provide that the sort instruction is a nibble sort instruction, and wherein the plurality of data items is a plurality of nibbles.

In Example 13, the subject matter of any of Examples 10, 11, and 12 can further provide that each position within the first register is associated with a position number, and wherein the each index identifies the position associated with the data item by the position number associated with the position.

In Example 14, the subject matter of any of Examples 10, 11, and 12 can further provide that the plurality of indices are stored in a plurality of positions within the second register in an order relating to the order of the plurality of data items stored in the first register after the sorting.

In Example 15, the subject matter of any of Examples 10, 11, and 12 can further provide that the first register and the second register are general purpose registers that have a same length.

In Example 16, the subject matter of any of Examples 10, 11, and 12 can further provide that the first register and the second register are general purpose registers that have different lengths.

In Example 17, the subject matter of any of Examples 10, 11, and 12 can further provide that the order of the data item values is an order of one of ascending data item values or descending data item values.

In Example 18, the subject matter of any of Examples 10, 11, and 12 can further provide that when executed, the processor employs the logic circuit to complete the sort instruction in no more than five processor cycles.

Example 19 is a method including storing, in a first register associated with a processor, a plurality of data items, storing, in a second register, a plurality of position numbers identifying target positions within a third register to store the plurality of data items, executing a sort instruction to sort the plurality of position numbers into an order of descending values and to store, in a fourth register, a plurality of indices, wherein each index identifies a position with a position number stored in the second register prior to the sorting, and executing a permutation instruction to generate a permutation of the plurality of data items to be stored in the third register based on the plurality of indices stored in the fourth register.

In Example 20, the subject matter of Example 19 can further provide that the sort instruction is implemented as a first execution unit of the processor, and wherein the permutation instruction is implemented as a second execution unit of the processor.

Example 21 is an apparatus comprising: means for performing the subject matter of any of Examples 19 and 20.

Example 22 is a machine-readable non-transitory medium having stored thereon program code that, when executed, perform operations including storing, in a first register associated with a processor, a plurality of data items, storing, in a second register, a plurality of position numbers identifying target positions within a third register to store the plurality of data items, executing a sort instruction to sort the plurality of position numbers into an order of descending values and to store, in a fourth register, a plurality of indices, wherein each index identifies a position with a position number stored in the second register prior to the sorting, and executing a permutation instruction to generate a permutation of the plurality of data items to be stored in the third register based on the plurality of indices stored in the fourth register.

In Example 23, the subject matter of Example 22 can further provide that the sort instruction is implemented as a first execution unit of the processor, and wherein the permutation instruction is implemented as a second execution unit of the processor.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
    a source register to store a plurality of source data items at a plurality of positions within the source register;
    a destination register to store a plurality of destination data items;
    a first register to store a plurality of position numbers identifying target positions within the destination register;
    a second register;
    a decoder unit comprising a logic circuit to decode a sort instruction,
    an execution unit, operatively coupled to the source register, the destination register, the first register, and the second register, the execution unit comprising a logic circuit to:
        execute the sort instruction to sort the plurality of position numbers in the first register into an order of descending or ascending values and to store a plurality of indices in the second register, wherein each of the indices identifies a position number of the corresponding source data item in the source register prior to the sorting.

2. The processor of claim 1, wherein the decoder unit is further to detect a permutation instruction, and wherein the execution unit is further to execute the permutation instruction to generate a permutation of the plurality of source data items to be stored as the plurality of destination data items in the destination register based on the plurality of indices stored in the second register.

3. The processor of claim 1, wherein the sort instruction is a byte sort instruction, and wherein the plurality of source data items is a plurality of bytes.

4. The processor of claim 1, wherein the sort instruction is a nibble sort instruction, and wherein the plurality of source data items is a plurality of nibbles.

5. The processor of claim 1, wherein each position within the source register is associated with a position number, and wherein the each index identifies the position associated with the source data item by the position number associated with the position.

6. The processor of claim 1, wherein the plurality of indices are stored in a plurality of positions within the first register in an order relating to the order of the plurality of source data items stored in the source register after the sorting.

7. The processor of claim 1, wherein the source register and the second register have a same length.

8. The processor of claim 1, wherein the source register and the second register have different lengths.

9. The processor of claim 1, wherein when executed, the processor employs the logic circuit to complete the sort instruction in no more than five processor cycles.

10. A system comprising:
    a memory device; and
    a processor coupled to the memory device, wherein the processor comprises:

a source register to store a plurality of source data items at a plurality of positions within the source register;

a destination register to store a plurality of destination data items;

a first register to store a plurality of position numbers identifying target positions within the destination register;

a second register;

a decoder unit comprising a logic circuit to decode a sort instruction; and an execution unit, operatively coupled to the source register, the destination register, the first register, and the second register, the execution unit comprising a logic circuit to execute the sort instruction to sort the plurality of position numbers in the first register into an order of descending or ascending values and to store a plurality of indices in the second register, wherein each of the indices identifies a position number of the corresponding source data item in the source register prior to the sorting.

11. The system of claim 10, wherein the decoder unit is further to detect a permutation instruction, and wherein the execution unit is further to execute the permutation instruction to generate a permutation of the plurality of source data items to be stored as the plurality of destination data items in the destination register based on the plurality of indices stored in the second register.

12. The system of claim 10, wherein the sort instruction is a byte sort instruction, and wherein the plurality of source data items is a plurality of bytes.

13. The system of claim 10, wherein the sort instruction is a nibble sort instruction, and wherein the plurality of source data items is a plurality of nibbles.

14. The system of claim 10, wherein each position within the source register is associated with a position number, and wherein the each index identifies the position associated with the source data item by the position number associated with the position.

15. The system of claim 10, wherein the plurality of indices are stored in a plurality of positions within the first register in an order relating to the order of the plurality of source data items stored in the source register after the sorting.

16. The system of claim 10, wherein the source register and the second register have a same length.

17. The system of claim 10, wherein the source register and the second register have different lengths.

18. The system of claim 10, wherein when executed, the processor employs the execution unit to complete the sort instruction in no more than five processor cycles.

19. A method comprising:

storing, in a source register associated with a processor, a plurality of source data items;

storing, in a first register, a plurality of position numbers identifying target positions within a destination register to store a plurality of destination data items; and executing a sort instruction to sort the plurality of position numbers in the first register into an order of descending values or ascending values and to store a plurality of indices in a second register, wherein each of the indices identifies a position number of the corresponding source data item in the source register prior to the sorting.

20. The method of claim 19, further comprising executing a permutation instruction to generate a permutation of the plurality of source data items to be stored as the plurality of destination data items in the destination register based on the plurality of indices stored in the second register.

* * * * *